US005557093A

United States Patent [19]
Knowles et al.

[11] Patent Number: 5,557,093
[45] Date of Patent: * Sep. 17, 1996

[54] COMPACT PROJECTION LASER SCANNER FOR PRODUCING A NARROWLY CONFINED SCANNING VOLUME FOR OMNI-DIRECTIONAL SCANNING OF CODE SYMBOLS THEREIN, WHILE PREVENTING UNINTENTIONAL SCANNING OF CODE SYMBOLS ON NEARBY OBJECTS

[75] Inventors: Carl H. Knowles, Moorestown; Charles A. Naylor, Sewell; David P. Bubnoski, Moorestown, all of N.J.

[73] Assignee: Metrologic Instruments, Inc., Blackwood, N.J.

[*] Notice: The term of this patent shall not extend beyond the expiration date of Pat. No. 5,216,232.

[21] Appl. No.: 365,193

[22] Filed: Dec. 28, 1994

Related U.S. Application Data

[63] Continuation of Ser. No. 36,314, Mar. 24, 1993, abandoned, which is a continuation of Ser. No. 580,738, Sep. 10, 1990, Pat. No. 5,216,232.

[51] Int. Cl.⁶ .................................................. G06K 7/10
[52] U.S. Cl. ................................ 235/462; 235/467
[58] Field of Search ..................... 235/467, 472, 235/462

[56] References Cited

U.S. PATENT DOCUMENTS

| | | | |
|---|---|---|---|
| 3,902,048 | 8/1975 | Fleischer et al. | 235/467 |
| 3,919,527 | 11/1975 | Bowen | 235/467 |
| 3,947,816 | 3/1976 | Rabedeau | 235/467 |
| 3,978,317 | 8/1976 | Yamaguchi et al. | 235/467 |
| 3,995,166 | 11/1976 | Hobart | 250/566 |

(List continued on next page.)

FOREIGN PATENT DOCUMENTS

| | | |
|---|---|---|
| 54-819 | 1/1979 | Japan . |
| 54-33710 | 3/1979 | Japan . |
| 54-122930 | 9/1979 | Japan . |
| 64-48017 | 2/1989 | Japan . |

OTHER PUBLICATIONS

Product Brochure for Omniscan OS–0712 by Micro Video, Inc., 1990.
Product Brochure for Omniscan OS–510 by Micro Video, Inc., 1990.
Product Brochure for Fujitsu Slimscan™ Holographic Scanner, by Fujitsu Systems of America, 1989.

(List continued on next page.)

*Primary Examiner*—Donald T. Hajec
*Assistant Examiner*—Karl D. Frech
*Attorney, Agent, or Firm*—Hopgood, Calimafde, Kalil & Judlowe

[57] ABSTRACT

A bar code scanner for stationary disposition at a counter to projecting a scanning pattern comprising first, second, third, fourth and fifth groups of parallel scan lines within a relatively narrow, yet diverging, volume, e.g., pyramid, cone, etc., centered about a projection axis. The scanner includes a compact housing mounted on an adjustable base. The housing includes a window, five stationary mirrors, a laser diode, a rotating reflective polygon for sweeping the laser beam from the diode across the mirrors and out a window so that the projection axis is substantially but not precisely perpendicular to the window. The scanner also includes a fixed curved collecting mirror and a concentrating lens to focus light which is reflected off of a bar code to a photodetector. One mirror extends along an axis parallel to the transverse axis to produce the first group of scan lines. The second and third mirrors are disposed opposite each other close to and laterally of the polygon and extending along respective axes at a small acute angle, e.g., 8 degrees, to the longitudinal axis to produce respective ones of the second and third group of scan lines. The fourth and fifth mirrors are disposed between the second and third reflecting mirrors, respectively, and each extends along a respective axis at a substantial acute angle, e.g., 48 degrees, to the longitudinal axis to produce respective ones of the fourth and fifth group of scan lines.

12 Claims, 5 Drawing Sheets

U.S. PATENT DOCUMENTS

| | | | |
|---|---|---|---|
| 4,006,343 | 2/1977 | Izura et al. | 235/470 |
| 4,026,630 | 5/1977 | Wollenmann | 359/17 |
| 4,093,865 | 6/1978 | Nickl | 250/566 |
| 4,097,729 | 6/1978 | Seligman et al. | 235/467 |
| 4,639,070 | 1/1987 | Ikeda et al. | 359/18 |
| 4,647,143 | 3/1987 | Yamazaki et al. | 359/18 |
| 4,652,732 | 3/1987 | Nickl | 235/462 |
| 4,713,532 | 12/1987 | Knowles | 235/467 |
| 4,766,298 | 8/1988 | Meyers | 235/462 |
| 4,795,224 | 1/1989 | Goto | 359/211 |
| 4,861,973 | 8/1989 | Hellekson et al. | 235/467 |
| 4,939,356 | 7/1990 | Rando et al. | 235/467 |
| 4,960,985 | 10/1990 | Knowles | 235/467 |
| 4,962,980 | 10/1990 | Knowles | 359/213 |
| 5,000,529 | 3/1991 | Katoh | 359/216 |
| 5,026,975 | 6/1991 | Guber et al. | 235/462 |
| 5,039,184 | 8/1991 | Murakawa | 359/216 |
| 5,073,702 | 12/1991 | Schuhmacher | 235/467 |
| 5,115,333 | 5/1992 | Mergenthaler | 359/196 |
| 5,124,537 | 6/1992 | Chandler et al. | 235/462 |
| 5,124,539 | 6/1992 | Krichever et al. | 235/472 |
| 5,153,417 | 10/1992 | Sakai | 235/457 |
| 5,196,696 | 3/1993 | Lindacher | 250/236 |
| 5,216,232 | 6/1993 | Knowles | 235/467 |
| 5,221,832 | 6/1993 | Collins et al. | 235/467 |

OTHER PUBLICATIONS

Product Brochure for Spectra–Physics Freedom™ Scanner, by Spectra Physics, Inc., circa 1988.

NCR Technology Marketing Division Product Release for NCR 7852 Scanner, published by NCR Corporation, circa 1988.

"Hologram Scanner for Pos Bar Code Symbol Reader" by Hiroyuki Ikeda, et al., published in Fujitsu Scientific & Technical Journal, vol. 15, Dec. 1979, No. 4, pp. 59–76, Dec. 1979.

COMPACT PROJECTION LASER SCANNER FOR PRODUCING A NARROWLY CONFINED SCANNING VOLUME FOR OMNI-DIRECTIONAL SCANNING OF CODE SYMBOLS THEREIN, WHILE PREVENTING UNINTENTIONAL SCANNING OF CODE SYMBOLS ON NEARBY OBJECTS

RELATED CASES

This is a continuation of application Ser. No. 08/036,314 filed Mar. 24, 1993, now abandoned which is a continuation of application Ser. No. 07/580,738 filed Sep. 10, 1990, now U.S. Pat. No. 5,216,232.

BACKGROUND OF THE INVENTION

This invention relates generally to laser scanning apparatus and more particularly to fix-mounted, e.g., counter type, laser scanning apparatus.

Various laser-based scanning systems have been disclosed in the patent literature and many are commercially available to read bar codes, e.g., the uniform product code, which is imprinted on packaging for product, or on the product itself, or on some other item.

One type of scanning system is referred to as a counter or "slot scanner". Such devices are generally mounted within a housing in a checkout counter of a supermarket or other retail establishment, and include a window at the top thereof through which a scanning pattern is projected. The scanning pattern is created by a laser and associated optical components, e.g., mirrors, etc., which typically produce plural scan lines which are either parallel to one another and/or intersect one another. When an item bearing a bar code is brought into the field of the scan pattern so that the pattern traverses the bar code light is reflected off of the bar code and is received back through the window of the slot scanner, whereupon decoding means converts the received light into an electrical signal indicative of the bar code. These signals can then be utilized to identify the article bearing the code and provide pricing information.

In order to ensure that a bar code is traversed suffiiently so that it can be read accurately irrespective of its orientation within the scan pattern, prior art counter scanners have utilized various optical configurations including mirrors, prisms, and the like to fold the laser beam and create complex patterns. Examples of such patterns are comb patterns, orthogonal patterns, interlaced patterns, star-like patterns, etc. While such patterns may be suitable for their purposes, the means for creating them has resulted in housings which were quite large in size.

In my U.S. Pat. No. 4,713,532 there is disclosed a counter or slot scanner producing an aggressive scanning pattern having three rastered groups of intersecting scan lines to form a large "sweet spot" to enable the bar code to be read omnidirectionally, i.e., irrespective of its orientation with respect to the scanner. That scanner is housed within a very compact, small footprint housing which is arranged to be mounted under a counter or disposed on a counter. Depending upon the orientation of the scanner, its window may be horizontal or at some other orientation, e.g., vertical. Devices embodying the teachings of that patent have been sold by the assignee of that patent (and of this application), Metrologic Instruments, Inc., under the designation MS260.

Metrologic Instruments, Inc. has also sold other compact counter or slot scanners under the designation MS360. Those scanners also produce a broad, aggressive scan pattern. In that case the pattern is made up of five rastered groups of intersecting scan lines.

While the aforementioned counter scanners have proved suitable for their intended purposes it has been determined that in certain applications the production of a broad scanning pattern is less than optimum. For example, in some check-out counter applications it is desirable to create a scanning pattern which, although aggressive, is confined within a relatively narrow volume, to prevent unintentional scanning of nearby objects. Hand-held scanners while providing for scanning within a confined volume (to prevent unintentional scanning), nevertheless suffer from various drawbacks, one of which being aggressiveness of the scanning pattern.

Thus, the need exists for a scanner device which combines the versatility of a hand-held scanner with the aggressiveness of a counter or slot scanner.

In many mass merchandizing applications it is desirable to have a scanner with the aggressiveness of a counter or slot scanner but which does require that the scanner be mounted or disposed with its window on the counter where it may present a snagging hazard to bar coded items, e.g., garments on hangers or hooks, if they are dragged across the counter for scanning. In other applications, e.g., where bar coded items are packaged in such a way as to require that they not be inverted, it is also desirable to provide an aggressive, fixed mount scanner to project the scanning pattern down toward the counter from above so that items can be scanned right-side-up.

Thus, the need also exists for a counter mounted scanner which can project an aggressive scanning pattern from the side or above to scan items brought into the pattern, yet which pattern is relatively confined to minimize counter space required to be clear of bar coded items.

Some commercially available scanners are arranged to be disposed or mounted to project a scanning pattern somewhat laterally to act as a "projection scanner". Examples of such scanners are the following: the "FREEDOM" scanner sold by Spectra Physics, the "7852" scanner sold by NCR, the "OMNISCAN" scanner sold by Microvideo, and the "SLIMSCAN" scanner sold by Fujitsu. While such scanners are generally suitable for their intended purposes they all suffer from one or more drawbacks, such as somewhat large housing and/or "footprint" size, amount of counter space to be kept clear of bar coded items, somewhat restricted working range, inability to scan all types of bar codes omnidirectionally and lack of agressiveness of scan pattern.

OBJECTS OF THE INVENTION

Accordingly, it is a general object of this invention to overcome the disadvantages of the prior art.

It is a further object of this invention to provide an extremely compact, fixed mounted scanning unit which overcomes the disadvantages of the prior art.

It is still a further object of this invention to provide a fixed mounted scanning unit which is arranged to project a rich scanning pattern into a confined volume for scanning a bar coded item brought therein irrespective of the orientation of the bar code.

It is yet a further object of this invention to provide an extremely compact, fixed mounted scanning unit which is arranged to project a rich scanning pattern laterally or downward into a confined volume for scanning a bar coded item brought therein.

SUMMARY OF THE INVENTION

These and other objects of the instant invention are achieved by providing a laser scanning device arranged to be stationarily supported at a counter for projecting a scanning pattern adjacent the counter, e.g., in a generally laterally outward direction with respect to said counter, and into which pattern a code having portions of different reflectivity, e.g., a bar code, to be scanned is located. The scanning pattern comprises plural, e.g., five, groups of plural, e.g., four, parallel scan lines.

The device basically comprises a compact housing, laser beam generating means, laser beam sweeping means, light reflecting means, light collecting means, and a window having a longitudinal axis and a transverse axis. The longitudinal and transverse axes of the window define a plane through which the scanning pattern is projected. The scanning pattern is generally confined within a relatively narrow, yet diverging, volume, e.g., pyramid, cone, frustum, etc., centered about a projection axis which is substantially but not precisely perpendicular to the plane of the window. For example, the projection axis may be at any angle within the range of from a slight deviation from precise perpendicularity up to approximately thirty (30) degrees therefrom. The light reflecting means comprises plural, e.g., at least five (5), reflecting members, e.g., mirrors. The laser beam sweeping means, e.g., a polygonal member having four (4) reflective surfaces arranged to be rotated about a rotation axis, serves to sweep the laser beam across the reflecting members, whereupon each of the reflecting members produces a respective one of the groups of lines of the pattern.

In one preferred embodiment of the device there are five reflecting members. The first reflecting member is disposed on a first axis of the housing opposite the polygonal member and extends along an axis parallel to the transverse axis. The first reflecting mirror is arranged to reflect the laser beam swept thereacross directly out through the window to produce the first group of scan lines. The second and third reflecting members are disposed on opposite sides of the first axis and closely adjacent laterally of the polygonal member. The first axis is parallel to the longitudinal axis and perpendicular to the transverse axis. Each of the second and third members extends along a respective axis at a small acute angle, e.g., 8 degrees, to the first axis and is arranged to reflect the laser beam swept thereacross directly out through the window to produce respective ones of the second and third groups of scan lines. The fourth and fifth reflecting members are disposed on opposite sides of the central axis between the second and third reflecting members, respectively, and each extends along a respective axis at a substantial acute angle, e.g., 48 degrees, to the longitudinal axis. Each of the fourth and fifth reflecting members is arranged to reflect the laser beam swept thereacross directly out through the window to produce respective ones of the fourth and fifth groups of scan lines.

The light receiving means comprises light focussing means and transducer means. The transducer means is arranged to receive light reflected from the code which enters the window, is reflected by the reflecting members and the beam sweeping means, e.g., the reflecting surfaces of the polygon, and is focussed by the focussing means, to convert it into an electrical signal indicative of the code.

The light focussing means basically comprises a collecting mirror having a concave reflective surface arranged to receive light from the beam sweeping means, e.g., reflective surfaces of the polygon, and to direct it to a concentrating lens. The lens acts to further focus the light onto the transducer means.

DETAILED DESCRIPTION OF THE PREFERRED EMBODIMENT

Figure 1:
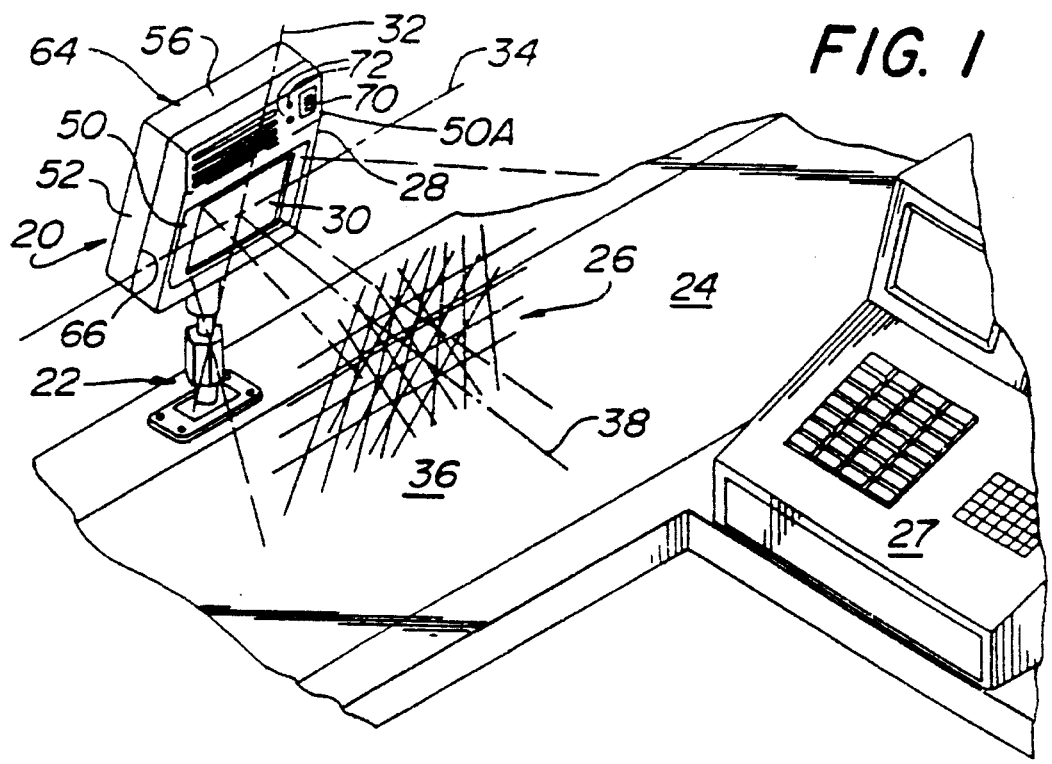
FIG. 1 is a perspective view of one embodiment of a laser scanning device constructed in accordance with the subject invention shown disposed on a conventional check-out counter of a retail establishment.

Referring now to various figures of the drawing wherein like reference characters refer to like parts there is shown in FIG. 1, one embodiment 20 of a retroreflective, laser barcode, scanner constructed in accordance with this invention.

The scanner 20 is mounted on a base 22 disposed on a counter 24, such as a checkout counter of a store, to project a scanning pattern 26 adjacent the counter. In the embodiment shown in FIGS. 1 and 5 the scanning pattern is projected laterally or downward over the counter. This orientation merely constitutes one of many orientations of the scanning pattern. In any event an article, such as a food container (not shown), having a conventional bar code (not shown), such as the UPC code, printed thereon is brought into the scanning pattern 26 by the checkout clerk, to enable the lines making up the pattern to sweep across the code to illuminate it with laser light, whereupon light reflected off the bar code is received back through the window by the components of the scanner. Such components process the received light into a bar code bearing electrical signal, as is conventional.

The scanning pattern of the subject invention is confined within a relatively narrow, yet diverging volume centered about a projection axis from the scanner (as will be described later) and includes plural groups of intersecting scan lines to create a "rich" pattern. This "rich" pattern ensures that sufficient lines of the pattern will sweep across the entire bar code to enable the proper reading or decoding thereof by conventional decoding means located within the scanner 20, irrespective of the orientation of the bar code within the scanning pattern. Moreover, by virtue of the fact that the volume or space in which scanning pattern is projected is somewhat narrow or confined, the amount of counter space which must be kept clear of other bar coded items to enable the proper scanning of the selected bar coded item, can be kept to a minimum. This should be contrasted with the use of conventional "slot-type" scanners, if mounted on a counter to project the scanning pattern thereabove. In such an arrangement the slot scanner produces such a wide or divergent pattern that a large amount of counter space must be reserved for scanning, and thus cannot be used for any other purpose, e.g., cannot be used to display for advertising or promotional purposes any item bearing a bar code, etc.

As is conventional the decoder utilized in the scanner 20 is arranged to provide electrical signals indicative of the decoded symbol to peripheral equipment, such as a conventional electronic cash register 27.

As will be described hereinafter, the scanner 20 is disposed within a housing 28 which is extremely compact. For example, in one commercial embodiment of the invention, the housing has a height of approximately 6.5 inches (165 mm), a width of approximately 6.5 inches (165 mm), and a thickness of approximately 3 inches (76 mm). The scanner housing 28 includes a window 30 through which the confined scanning pattern 26 is projected.

Figure 5:
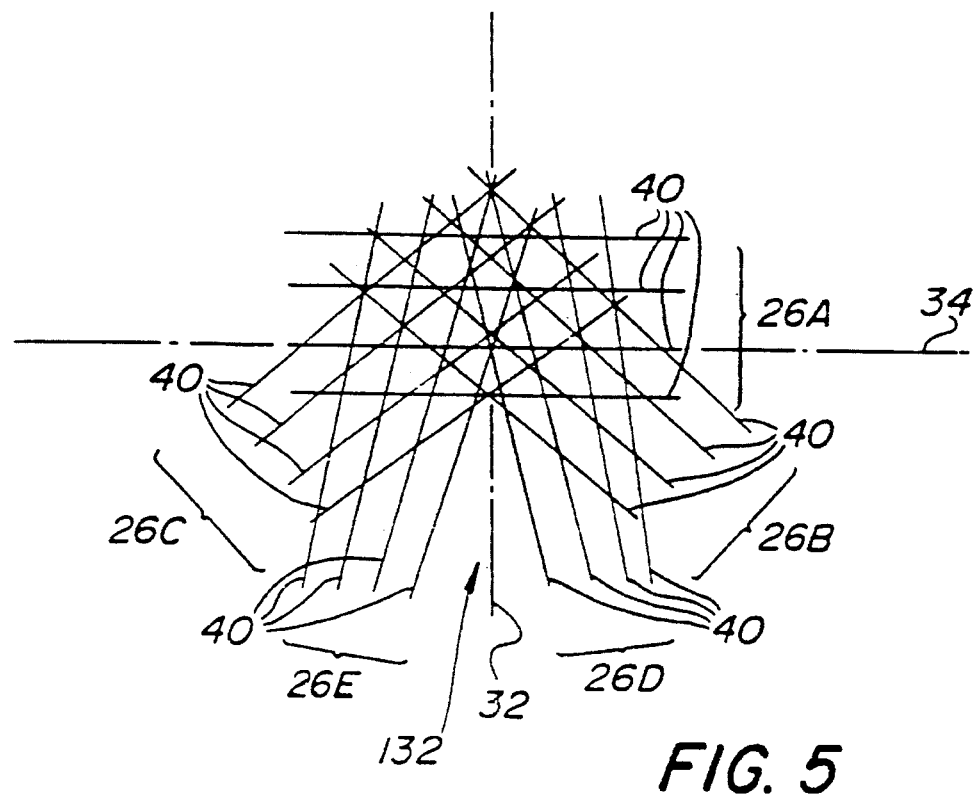
FIG. 5 is a plan view of the scanning pattern produced by the device shown in FIG. 1 at the plane of its window.

As can be seen in FIG. 1 the base 22 on which the scanner is mounted is also extremely compact in size. Moreover, the base 22 is arranged to be adjusted to various orientations to hold the scanner housing with the window 30 in any desired orientation so that the scanning pattern is projected in any desired orientation with respect to the counter, e.g., laterally outward and slightly downward toward the counter as shown in FIGS. 1 and 5, upward with respect to the counter like that of a conventional slot scanner (not shown), or in any other desired orientation (not shown).

Before describing the details of the construction of the scanner 20, the scanning pattern produced thereby will be described. That pattern is shown clearly in FIGS. 1 and 5 and is produced within the scanner housing 28 and projected thereout through the window 30. The window 30 is a generally planar, optically transparent member defined by a longitudinal axis 32 and a normally intersecting transverse axis 34. The scanning pattern 26 is projected into a confined space or volume 38 (see FIG. 1), which as mentioned earlier is a relatively narrow, yet diverging and is centered about a projection axis 38. The diverging volume 36 containing the pattern may be of any shape, e.g. pyramidal, conical, irregular, etc., depending upon the length of the various lines of the pattern (i.e., the "envelope" defined by the end points of each line of the pattern) and may be established by the size of the scanner's mirrors and/or the size and shape of the window. In the interest of drawing simplicity the envelope defining volume 36 is shown as being pyramidal and as such is merely exemplary of the myriad of shapes possible. The projection axis 38 extends substantially perpendicular to the plane of the window. By "substantially perpendicular" it is meant that the projection axis is not precisely pependicular to the plane of the window, i.e., it deviates from perpendicularity up to a small acute angle, e.g., thirty (30) degrees, to perpendicularity. The reason that the projection axis is not precisely perpendicular to the plane of the window is to preclude overloading of the transducer, e.g. the photodetector (to be described later), in the light receiving means which could occur if the exiting laser beam was reflected back off the window to the transducer.

It should be pointed out at this juncture that the lines making up the scanning pattern are preestablished in configuration and orientation with respect to one another, but appear differently, depending upon the shape and position of the surface upon which the pattern is projected and depending upon the distance of the surface from the scanner window. In FIG. 1 the scanning pattern 26 shown is merely schematic and indicative of a typical pattern projected on a flat surface within the volume 36, approximately six inches from the window 30 and generally perpendicular to the projection axis. In FIG. 5 the scanning pattern is shown as it appears within housing at the plane of the window 30.

As can be seen the scanning pattern 26 basically consists of five groups 26A, 26B, 26C, 26D, and 26E of plural, scan lines 40. The scan lines in each group are disposed generally parallel to one another and in the embodiment of FIGS. 1–4 are preferably substantially equidistantly spaced in a "raster-like" configuration. In the embodiment shown herein there are four scan lines 40 in each group 26A–26E.

The lines 40 making up group 26A are disposed generally parallel to the transverse axis 34 of the window. These lines, when projected in volume 36, are somewhat horizontal and are very powerful in their ability to readily scan "picket fence" oriented bar codes, whether truncated or not. The lines 40 making up group 26B intersect the lines 40 of group 26A and extend at a substantial acute angle, e.g., 28°, to longitudinal axis 32 to be oriented generally diagonally when projected into volume 36. The lines 40 making up group 26C are mirror images of the lines making up group 26B and are disposed on the opposite side of the longitudinal axis 32 from the lines making up that group. The two groups 26B and 26C serve to readily scan bar codes which are tilted with respect to a "roll" axis (not shown) generally perpendicular to the window. The lines 40 of groups 26D are each oriented at a small acute angle, e.g., 8°, to the longitudinal axis 32 so as to be oriented generally vertically when projected into the volume 36. The lines 40 making up group 26E are mirror images of the lines making up group 26D and are disposed on the opposite sides of the longitudinal axis from the lines making up that group. The groups 26D and 26E serve to readily scan "ladder" oriented bar codes.

The rastered lines 40 of the groups substantially fill the volume 36 to produce a very rich scanning field having very few gaps. This feature facilitates the assured scanning of a bar code brought into the pattern irrespective of its orientation since the entire bar code will be swept (traversed) by one or more lines. Accordingly, the scanner operator need not precisely place or orient the bar code within the pattern so long as the bar code is within the volume and somewhat directed toward the scanner's window.

The means for sweeping the laser beam to create the scan lines 40 making up the groups may consist of any suitable means, e.g., an oscillating mirror, an electro-optic scanner, etc. In the preferred embodiment shown herein the beam sweeping means basically comprises a four sided polygon 42 arranged for rotation about a rotation axis 44. Each face 46 of the polygon is reflective, e.g., is a mirror (preferably planar), and tilted at a different respective angle with respect to the rotation axis. Thus, as the laser beam 48 is swept by the various faces of the polygon (to be described later) it produces the four generally parallel, generally equidistantly spaced lines 40 of each group. It should be noted that the faces of the polygon need not be oriented so that the line spacing is equadistant, if a different spacing arrangement is desired.

Figure 2:
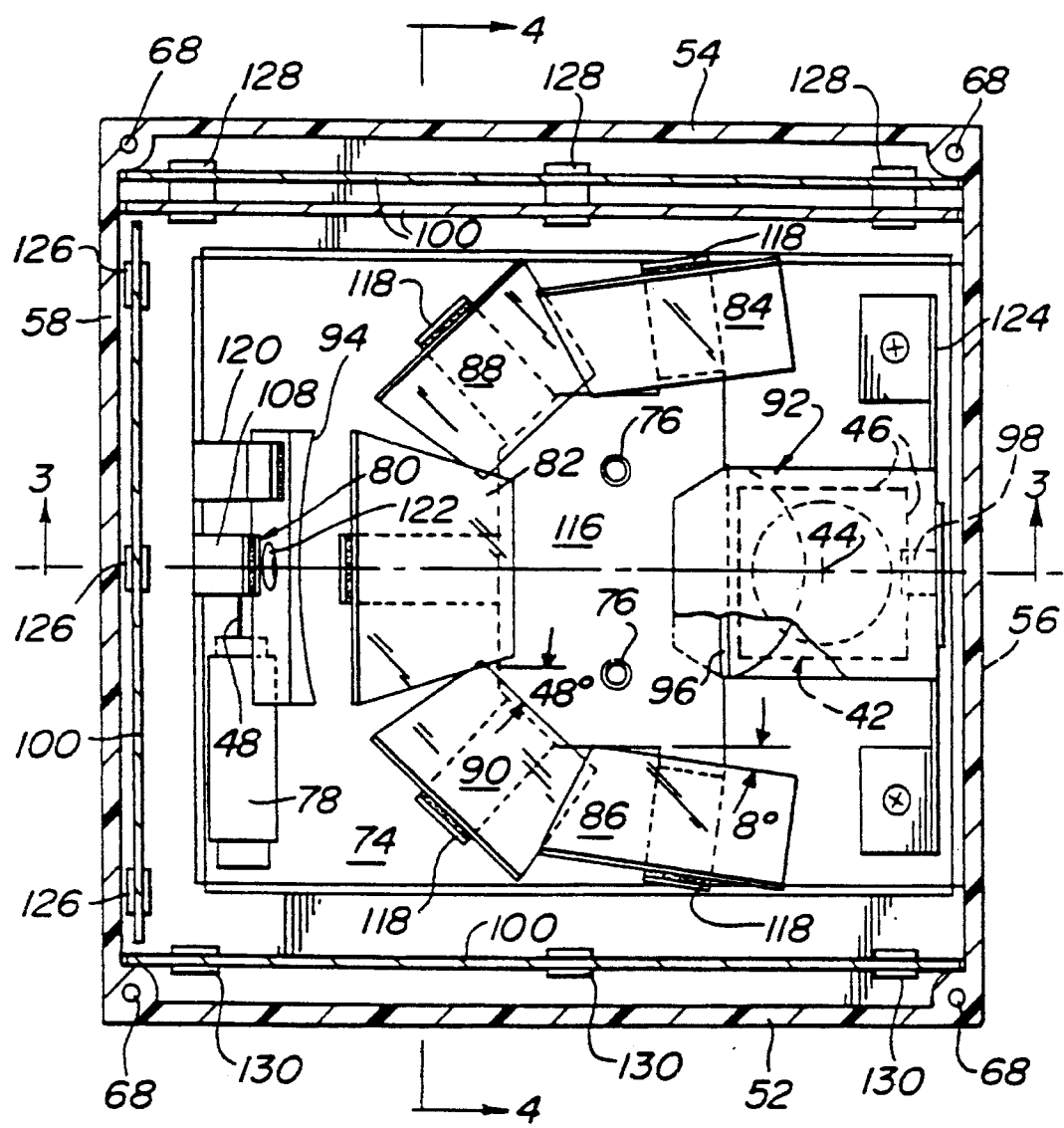
FIG. 2 is an enlarged top plan view, partially in section, of the scanning device shown in FIG. 1.
Figure 3:
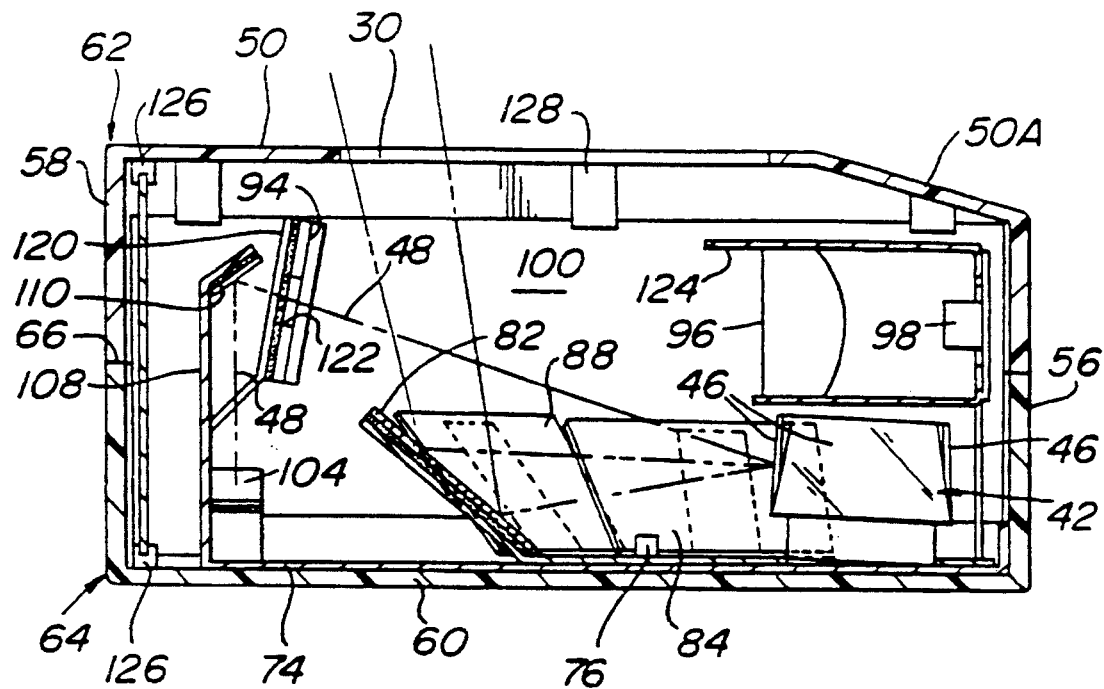
FIG. 3 is a sectional view taken along lines 3—3 of FIG. 2.
Figure 4:
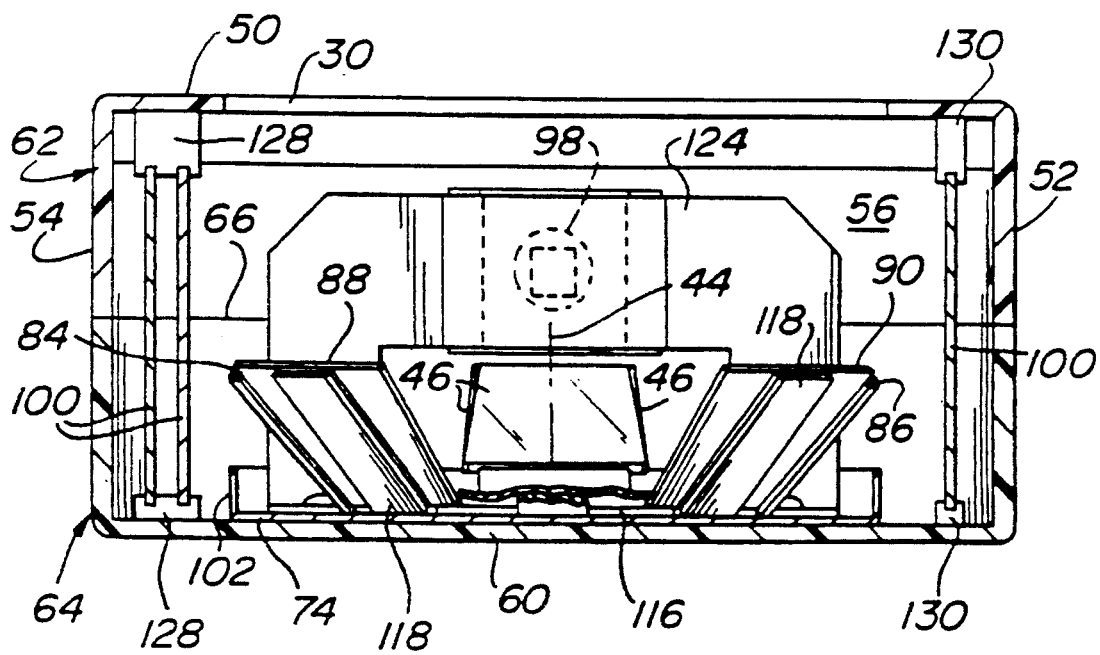
FIG. 4 is a sectional view taken along lines 4—4 of FIG. 3.

Referring now to FIGS. 1 and 2–4 details of the construction of the scanner 20 will now be described. Thus, can be seen the housing 28 basically comprises a front wall 50, a pair of side walls 52 and 54, a top wall 56, a bottom wall 58 (FIGS. 3 and 4) and a rear wall 60 (FIGS. 3 and 4). The housing is preferably formed of two plastic sections 62 and 64 which are each integrally molded and which when joined along their respective periphery edges 66 complete the housing. The two sections 62 and 64 of the housing are arranged to be secured together via conventional threaded fastening means (not shown) extending through respective holes 68 located in the corners of the housing (as shown in FIG. 2).

As can seen in FIGS. 1 and 3 the front wall 50 of the housing 28 includes an inclined surface portion 50A at the interface of the front wall 50 and the top wall 56. It is on the inclined portion that a suitable on/off switch 70 and indicator lights or LED's 72 are located.

The window 30 is located within the front wall 50 and, as can be seen in FIG. 1, is of generally rectangular shape.

The scan pattern 26 is produced by sweeping a sharply defined laser beam 48 across various optical components located within the housing. These components serve to fold the beam into the desired orientations to form the lines 40 making up the pattern. The means for producing the beam, focusing it, sweeping it through the housing, folding it and directing it out of the housing window are all mounted on an optical bench 74 mounted via fasteners 76, on the inside surface of the rear wall 60 of housing section 64 (see FIG. 3). Those components will be described in detail later. Suffice for now to state that those components basically comprise a visible laser diode 78 (or any other suitable means for generating a laser beam), beam focusing and directing means 80, a beam sweeping mechanism in the form of the four sided rotating reflective polygon 42 (described heretofore), plural beam-folding reflecting members 82, 84, 86, 88, and 90, and a light collecting system 92.

The light collecting system 92 basically comprises a collecting mirror 94, a focusing lens 96, and a transducer 98, e.g., photodiode. The light collecting means is arranged to receive the light which is reflected off a bar code held within the scanning pattern to convert the received light into an electrical signal indicative thereof. That signal is provided to signal processing means and associated decoding means all located within the housing 30 on printed circuit boards 100 (to be described later) to effect decoding of the symbol and to provide an electrical signal indicative of the decoded symbol to the cash register 28 or other output device (not shown). The details of the structure and operation of the light collecting system 92 will be described later.

The optical bench 74, as clearly seen in FIGS. 2–4, is a generally rectangular, plate-like member which includes a flange 102 extending along its two side edges and along its bottom edge. The laser diode 78 is fixedly mounted on the optical bench adjacent the bottom edge flange and is oriented parallel to the bench so that it projects a laser beam 48 parallel to the optic bench and in a transverse direction, that is parallel to the transverse axis 34 of the window 30. A beam directing mirror 104 is mounted (e.g., glued) on a bracket 106 disposed opposite the laser diode. The mirror 104 is angled at approximately 45° to the plane of the optic bench to direct the laser beam 48 upward, that is away from the optic bench perpendicularly to the window (see FIG. 3). The lower edge flange of the optic bench includes a bracket 108 on which is mounted another beam directing mirror 110. The mirror 110 is disposed above the mirror 104 and is oriented at an angle to receive the laser beam 48 from the mirror 104 and to direct it parallel to the longitudinal axis 32 toward the rotational axis 44 of the polygon 42.

The polygon is mounted on the rotary output shaft of a motor 112 which is fixedly mounted on the optical bench so that its rotation axis 44 intersects an axis 114. The axis 114 extends parallel to the longitudinal axis 32 of the window and forms the central longitudinal axis of the optical components making up the scanner.

As mentioned earlier the polygon 42 basically comprises four reflective, e.g., mirrored, planar surfaces 46. Each of these surfaces extends at a respective acute angle to the axis of rotation 44 of the polygon. In particular in the preferred embodiment shown herein one face 46 is tilted 2° to the rotation axis, while the other faces are tilted at approximately 4, 6 and 8 degrees, respectively, to the axis of rotation. The polygon is rotated about the rotation axis, via the motor 112, under power and control of the electronic circuitry mounted on the printed circuit boards 100.

The movement of each polygon face about the rotation axis 44 causes the laser beam 48 reflected off of downwardly extending mirror 110 to sweep through an arcuate path in front of and to the sides of the polygon face, to thereby create a scan line which is linear when projected onto a planar surface. The linear scan line produced by each face is folded by the beam folding mirrors 82–90 (to be described hereinafter) to form a respective line 40 of each of the respective groups 26A–26E. Inasmuch as the reflective faces 46 of the polygon are each disposed at a slight angle (e.g., 2, 4, 6 and 8 degrees) to the rotational axis 44 each reflective face of the polygon sweeps the laser beam 48 across a different portion of the folding mirrors 82–90, thereby producing the parallel lines 40 (i.e., the "raster") of the various groups.

The details of the reflecting means made up of mirrors 82–90 will now be described. All of the mirrors are of generally planar and are mounted on the optical bench 74 adjacent the polygon 42 and under the window 30. In particular the mirrors 82–90 are mounted via a spider member 116 having five angled brackets 118, one for each mirror. The spider 116 secured to the optical bench 74 via the fasteners 76. Preferably the mirrors 82–90 are glued in place on the spider's brackets 118.

As can be seen clearly in FIGS. 2 and 4 the mirror 90 is mounted so that it extends generally transversely, that is perpendicular to the longitudinal central axis 114 of the scanner, while being basically centered with respect thereto. The mirror 82 is tilted upward at an angle of approximately 45° to the plane of the window 30. The mirror 82 forms the scan lines 40 making up group 26A.

The mirrors 84 and 86 are disposed on opposite sides of the central longitudinal axis 114 immediately adjacent the polygon 42. In fact portions of the mirrors 84 and 86 extend past the forwardly facing face of the polygon. Each of the mirrors 84 and 86 extends at a respective small acute angle, e.g. 8°, to the longitudinal axis 114, with each of the mirrors being angled upward at approximately 45 degrees to the window 30. The mirrors 84 and 86 form the scan lines 40 of groups 26D and 26E, respectively.

The mirrors 88 and 90 are disposed on either side of the longitudinal central axis 114, with mirror 88 being interposed between mirror 82 and mirror 84, and with mirror 90 being interposed between mirror 82 and mirror 86. The intermediate mirrors 88 and 90 each extend at a substantial acute angle, e.g., 48°, to the central longitudinal axis 114 of the scanner and each is angled upward at approximately 45 degrees to the window 30. The mirrors 88 and 90 form the scan lines 40 making up the groups 26B and 26C, respectively.

The formation of one line 40 of each group 26A–26E is accomplished as follows: the rotation of the polygon 42 causes the beam 48 projected onto one face 46 thereof to be swept across the lateral mirror 86, in the clockwise direction where viewed in FIG. 2 (to form one line of group 26E) then across mirror 90 (to form one line of group 26C), then across mirror 82 (to form one line of group 26A), then across mirror 88 (to form one line of group 26B), and finally across mirror 84 (to form one line of group 26D). Inasmuch as each of the mirrors is angled upward with respect to the window the sweep of the beam thereacross causes that mirror to project the laser beam line out of the window, thereby producing a respective line 40 of each of the groups as described above. Moreover, inasmuch as the next successive face 46 of the polygon 42 is at a slight angle (e.g., 2 degrees) with respect to the proceeding face the next scan line 40 swept across the mirror 86, 90, 82, 88, and 84, will cross those mirrors at a different location than the beam swept by the previous polygon face. Accordingly, such action produces a second respective scan line 40 of each of the groups 26A–26E.

The foregoing scanning process is carried out by each successive face of the polygon as it rotates about the rotation axis to produce the rastered lines of the groups. The motor is rotated at a very high rate of speed, e.g., in excess of 5,000 rpm so that the scanner produces in excess of 400 scans per second.

The details of the light collecting system 92 of the scanner 20 will now be described. As mentioned earlier that system is arranged to receive the light which is reflected off a bar code within the scan pattern volume and which passes back through the window 30 into the interior of the housing 28. The light coming back through the window is reflected by the mirrors 82–90 back to the faces of the rotating polygon, whereupon each of those faces directs the reflected light to the light collecting system, and in particular to heretofore identified collecting mirror 94.

As can be seen clearly in FIG. 2 the collecting mirror 94 basically comprises a concave reflecting surface, which in the preferred embodiment is spherical. The mirror is mounted, e.g., glued, onto a bracket 120 projecting upward from the optical bench 74 and is spaced in front of the mirror 110. In order to enable the laser beam 48 produced by the laser diode 78 from passing from mirror 110 to the rotating polygon 42, the spherical collecting mirror 94 includes a central opening 122 therein.

The collecting mirror 94 is oriented slightly downward (see FIG. 3) to be aimed at the polygon. The collecting mirror receives the reflective light from each face 46 of the polygon and concentrates or focuses it and directs it to the focusing lens 96. The focusing lens 96, as can be seen in FIGS. 2–4 is mounted opposite the collecting mirror along central longitudinal axis 114 and above the polygon 42. The means for mounting the focusing lens at that position comprises a bracket 124 fixedly secured to the front portion of the optical bench 74. As can be seen the photodiode 98 is also mounted within the bracket 124, but behind the lens 96. The lens is arranged to converge or focus the light reflected by the spherical collecting mirror 94 onto the photodiode 98.

The use of the focusing lens 96 in conjunction with the collecting mirror 94 provides the scanner 20 with a greater depth of field for scanning bar codes then would otherwise be possible with a similarly small sized housing. By depth of field it is meant the range of distances measured from the window outward that a bar code can be effectively scanned.

The use of the focusing lens 96 ensures that the light spot which is projected onto the photodiode is kept sufficiently small for a larger depth of field than would be possible with the use of the spherical collecting mirror alone. Moreover, since the spherical collecting mirror includes the central opening 122, absent the lens 96 when scanning bar codes disposed close to the window the image projected from the spherical collecting mirror to the photodetector may include an area of no light (e.g., the image of the hole 122). Obviously, such action is undesirable. The use of the focusing lens 96 obviates that potential problem.

It should be pointed out at this juncture that the light collecting system as just described is merely exemplary. Thus, other light collecting systems, e.g., a lens, hologram, etc., may be used in lieu of the collecting mirror 94 and associated focussing lens 96.

As mentioned earlier, the electronic and various other electrical components for the scanner 20 are mounted on various printed circuit (PC) boards in the housing. Thus, as can be seen one printed circuit board 100 is mounted, via opposed brackets 126, so that it is disposed immediately adjacent the bottom wall 58 of the housing 28, while a pair of printed circuit boards 100 are mounted between opposed brackets 128, adjacent one side wall 54 of the housing, and another printed circuit board 100 is mounted between oppopsed brackets 130 adjacent the other side wall 52 of the housing. Another small printed circuit board (not shown) is mounted adjacent the front face of a housing near the inclined portion 50A.

As should be appreciated by those skilled in the art, the pattern produced by the scanner 20 is quite effective for scanning various types of bar code labels, be they "picket fence" oriented, or "ladder" oriented. However, if a bar code is a truncated and ladder oriented code and is held a substantial distance from the window, the truncated bar code may be located within a small gap between the lines 40 making up groups 26D and 26E, i.e., the portion of the pattern designated by the reference numeral 132 in FIG. 5. Merely broadening the raster, that is the spacing between the various respective lines of the respective groups, will not obviate that problem without generating the attendant problem of creating gaps in the field at other places through which ladder style symbols can slip unread.

Thus, in order to further augment the coverage of ladder oriented symbols up close to the scanner's window, the side mirrors 84 and 86 may be modified so that each is split into two parts. This arrangement is shown in the embodiment of the scanner of FIGS. 6 and 7. That scanner produces a scan pattern like that shown in FIG. 8. In such an arrangement the more vertically oriented scan fields 26D and 26E can be broadened up close to the window without having an adverse effect at a distance from the window. Thus, one gets the advantage of broadening the field closely adjacent the window of the scanner, but not generating too broad a field at the outer distance limit of the depth of field.

Figure 6:
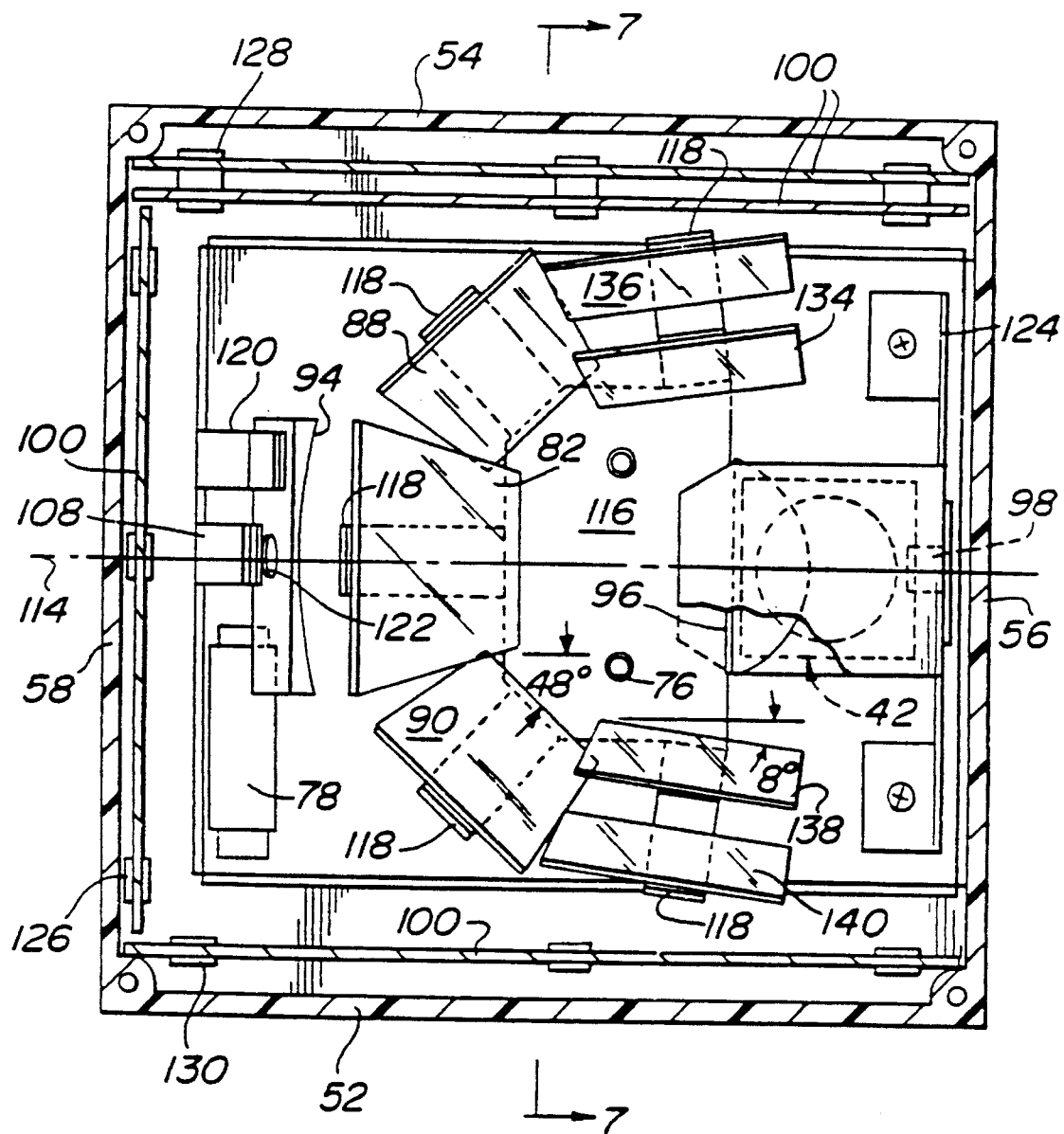
FIG. 6 is a top plan view, partially in section, similar to that of FIG. 2, but showing an alternative embodiment of the scanning device shown in FIG. 1.
Figure 7:
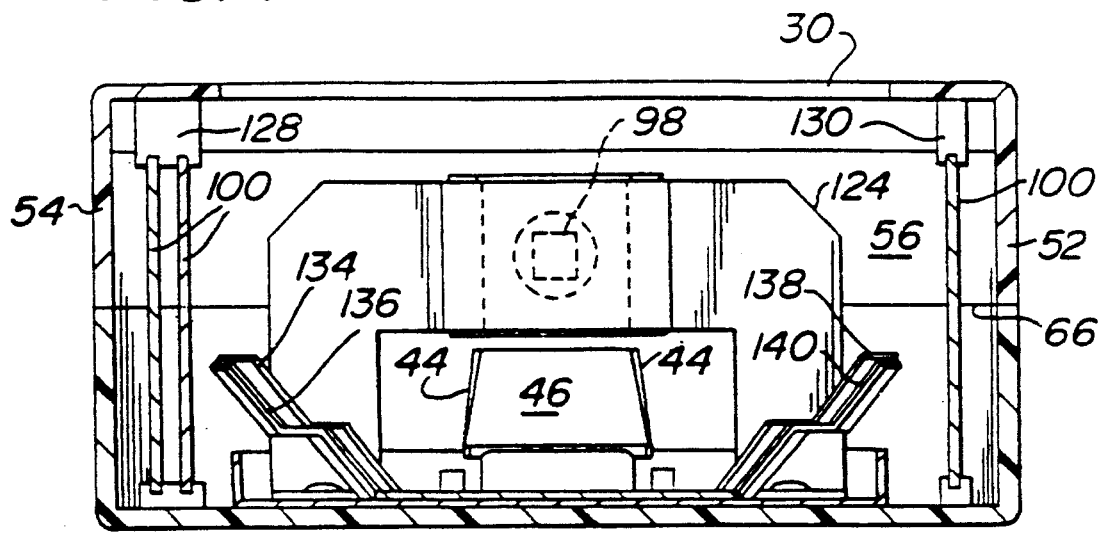
FIG. 7 is a sectional view taken along lines 7—7 of FIG. 6.

The embodiment of the scanner 20 shown in FIGS. 6 and 7 is identical in all respects to that shown in FIGS. 1–4 except that the two sides mirrors 84 and 86 of the embodiment of FIGS. 1–4 are replaced by two pairs of side mirrors 134 and 136 and 138 and 140, as will be described hereinafter. In the interest of brevity, all of the identical components of the embodiment of FIGS. 1–4 are given the same reference numerals in the embodiment of FIGS. 6 and 7, and their structure and function will not be reiterated hereinafter.

Figure 8:
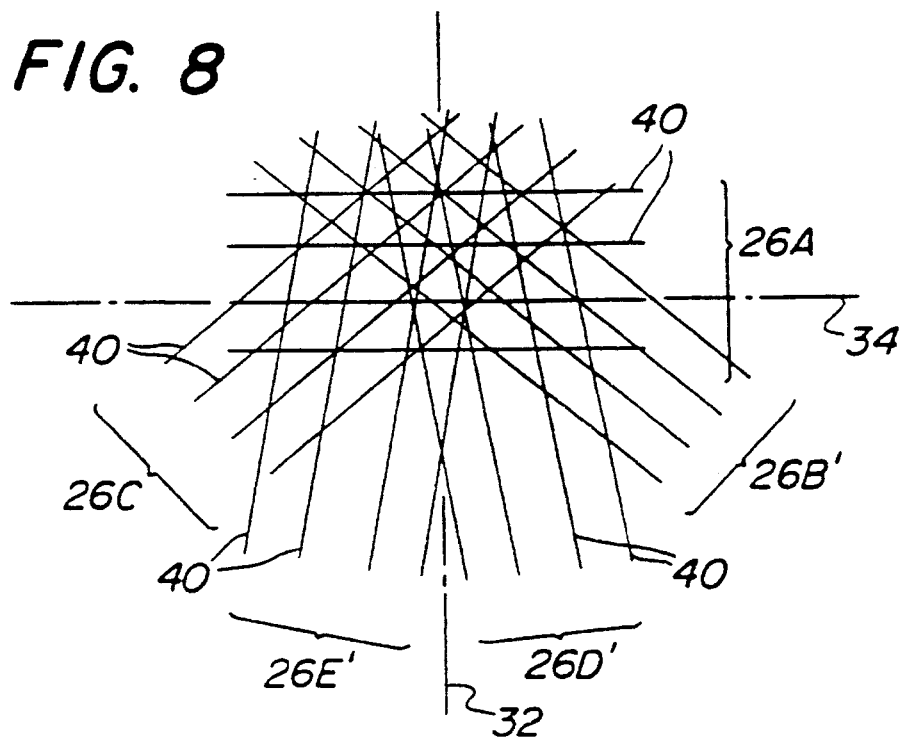
FIG. 8 is a plan view of the scanning pattern produced by the device shown in FIG. 6 at the plane of the scanner's window.

As can be seen in FIGS. 6 and 7, a pair of side mirrors 134 and 136 are mounted on one side of the central longitudinal axis 114, (and correspond to mirror 84) while a similar and mirror image pair of mirrors 138 and 140 are mounted on the opposite side of the central longitudinal axis (and correspond to mirror 86). The mirrors 134–140 are mounted by respective brackets 118 of the spider and are each oriented so that they extend at the same small acute angle, e.g., 8°, to the longitudinal axis as the mirrors 84 and 86 described heretofore. Moreover, the mirrors 134 and 136 are parallel to each other, and the mirrors 138 and 140 are parallel to each other. The mirrors 134 and 136 jointly establish the lines 40 of the group 26D, while the mirrors 138 and 140 jointly establish the lines of the group 26E. The spacing, that is the lateral offset between mirrors 134 and 136, and between mirrors 138 and 140 produces two sets of lines in groups 26D and 26E. As can be seen in FIG. 8, the two sets of lines are spaced slightly from each other so that all of the lines of those groups are not equidistantly spaced, as is the case in the embodiment of scanner 20 shown in FIGS. 1–4. Thus, as shown in FIG. 8, the side groups 26D and 26E of the pattern 26 are closer together, thereby eliminating the gap 132 of the pattern of FIG. 5.

As should be appreciated by those skilled in the art the planes of the pairs of the side mirrors must be parallel. Otherwise, the reflected portion of the beam coming back off the bar code could not be returned through the return focusing system to the photodetector.

As will be appreciated from the foregoing, the projection scanner 20 as described heretofore, scans omnidirectionally, that is the bar code can be presented in any orientation within the field. Moreover, the scanner provides free-hand scanning productivity as heretofore been provided by conventional counter mounted, slot scanners, plus hand-held scanning flexibility as provided heretofore by hand-held scanners. Furtherstill, being of such a small size, e.g., 6.5 inches long by 6.5 inches wide by 3 inches deep, the scanner is adaptable to fit just about any size, space and mounting requirements, and provides a small, unobtrusive foot print. The highly collimated or focused volume of the scan prevents unintentional scanning of nearby projects.

Without further elaboration the foregoing will so fully illustrate our invention that others may, by applying current or future knowledge, readily adapt the same for use under various conditions of service.

We claim:

1. A projection laser scanner for producing a narrowly confined scanning volume for scanning code symbols presented therein, while preventing unintentional scanning of code symbols on nearby objects located outside thereof, said projection laser scanner comprising:

(a) a compact housing having a light transmission window with a substantially planar extent through which laser light can exit said compact housing and travel towards an object bearing a code symbol, reflects therefrom, travel back through said light transmission window, and enter said compact housing;

(b) an optical bench fixedly mounted in said compact housing and having a central reference axis extending along the longitudinal extent of said optical bench;

(c) a laser beam producing means disposed within said compact housing and fixedly mounted with respect to said optical bench for producing a laser beam;

(d) a laser beam sweeping means disposed within said compact housing and mounted with respect to said optical bench for rotation about a rotational axis intersecting said central reference axis;

said laser beam sweeping means having at least first, second and third rotating light reflective surfaces each being disposed at a different acute angle with respect to said rotational axis, for sweeping the laser beam about said rotational axis along a plurality of different paths, and said intersection of said rotational axis and said central reference axis defining a central reference plane extending along the longitudinal extent of said optical bench;

(e) a stationary array of at least first, second, third, fourth and fifth stationary light reflective surfaces disposed within said compact housing substantially under said light transmission window and fixedly mounted with respect to said optical bench, said first stationary light reflective surface having a transverse axis extending substantially perpendicularly with respect to said central reference plane, said second and third stationary light reflective surfaces being symmetrically disposed on opposite sides of said central reference plane, respectively, and immediately adjacent said first stationary light reflective surface, and said fourth and fifth stationary light reflective surfaces being symmetrically disposed on opposite sides of said central reference plane, and immediately adjacent said second and third light reflective surfaces, respectively, and adjacent said laser beam sweeping means;

(f) a light collection subsystem disposed within said compact housing and fixedly mounted with respect to said optical bench, said light collection subsystem including (1) a light collection mirror fixedly mounted along said central reference plane, at a height above and immediately adjacent said first stationary light reflective surface and allowing the laser beam produced from said laser-beam producing means to pass from said light collection mirror, substantially along said central reference plane, directly to said laser beam sweeping means, for sweeping said laser beam about said rotational axis thereof along said plurality of different paths, and (2) light receiving means for receiving light from said light collection mirror at a height above said laser beam sweeping means and at a point substantially within said central reference plane, and detecting the intensity of said received light and producing an electrical signal indicative of said detected intensity;

(g) signal processing means disposed within said compact housing, for processing said electrical signal;

(h) control means disposed within said compact housing for controlling the operation of said laser beam producing means and said laser beam sweeping means so that, during scanner operation, the laser beam produced from said laser beam producing means passes from said light collection mirror, substantially along said central reference plane, directly to said first, second and third rotating light reflective surfaces of said laser beam sweeping means, and as the laser beam reflects off said first, second and third rotating light reflective surfaces the laser beam is repeatedly swept across said first, second, third, fourth and fifth stationary reflective surfaces thereby producing first, second, third, fourth and fifth groups of plural scan lines, respectively, which are projected out through said light transmission window and intersect about a projection axis extending from said light transmission window, and within a narrowly confined scanning volume extending from adjacent said light transmission window to at least about six inches therefrom so as to produce a highly collimated projected scanning pattern within said narrowly confined scanning volume, by which a code symbol can be scanned omni-directionally while preventing unintentional scanning of code symbols on objects located outside of said narrowly confined scanning volume, each scan line in said first group of scan lines being substantially parallel to each other scan line in said first group of scan lines, each scan line in said second group of scan lines being substantially parallel to each other scan line in said second group of scan lines, each scan line in said third group of scan lines being substantially parallel to each other scan line in said third group of scan lines, each scan line in said fourth group of scan lines being substantially parallel to each other scan line in said fourth group of scan lines, each scan line in said fifth group of scan lines being substantially parallel to each other scan line in said fifth group of scan lines, whereby when the code symbol is presented to the highly collimated projected scanning pattern within said narrowly confined scanning volume, the code symbol is scanned within said highly collimated projected scanning pattern and at least a portion of the laser light reflected from said scanned code symbol is directed through said light transmission window, reflected off said first, second, third, fourth and fifth stationary light reflective surfaces, reflected off said first, second and third rotating light reflective surfaces of said laser beam sweeping means, collected by said light collection mirror, and received by said light receiving means for detection, whereupon said electrical signal is produced for use in decode signal processing; and (i) said compact housing including a base means for supporting said optical bench with respect to a counter surface so that said highly collimated projected scanning pattern is projected above said counter surface for scanning the code symbol presented to said highly collimated projected scanning pattern.

2. The projection laser scanner of claim 1, wherein said signal processing means further comprises means for decode processing said electrical signal and producing data representative of said scanned code symbol.

3. The projection laser scanner of claim 1, wherein said different acute angles are selected so that the scan lines in each said group of scan lines are substantially equidistant from each other at any distance from said light transmission window.

4. The projection laser scanner of claim 1, wherein said laser beam producing means comprises a laser diode fixedly mounted with respect to said optical bench, and wherein said first, second, third, fourth and fifth stationary light reflective surfaces comprise first, second, third, fourth and fifth planar mirrors, respectively, each fixedly mounted with respect to said optical bench.

5. The projection laser scanners of claim 1, wherein said first, second, third, fourth and fifth stationary reflective surfaces comprise first, second, third, fourth and fifth planar mirrors, respectively.

6. The projection laser scanner of claim 1 wherein said compact housing has a height dimension of less than about 6.5 inches, a width dimension of less than about 6.5 inches, and a thickness dimension of less than about 3 inches.

7. The projection laser scanner of claim 1, wherein said highly collimated laser scanning pattern is oriented laterally outward above said counter surface at a point of sale station.

8. The projection laser scanner of claim 1, said base means further comprises means for selectively supporting said optical bench in any one of a plurality of positions above said counter surface so that said highly collimated scanning pattern is projected about said projection axis above said counter surface in any one of a plurality of orientations corresponding to said plurality of positions.

9. The projection laser scanner of claim 1, wherein said optical bench comprises a planar support structure upon which said first, second, third, fourth and fifth stationary light reflective surfaces are fixed mounted.

10. The projection laser scanner of claim 1, wherein said light receiving means comprises a photodetector.

11. The projection laser scanner of claim 10, wherein said photodetector is disposed at a height above said laser beam sweeping means, substantially within said central reference plane.

12. The projection laser scanner of claim 1, wherein said code symbol is a bar code symbol.

* * * * *